United States Patent
Shirane et al.

(10) Patent No.: US 8,313,862 B2
(45) Date of Patent: Nov. 20, 2012

(54) NON-AQUEOUS BATTERY WITH COLUMNAR ACTIVE MATERIAL

(75) Inventors: Takayuki Shirane, Osaka (JP); Kaoru Inoue, Osaka (JP); Masaya Ugaji, Osaka (JP)

(73) Assignee: Panasonic Corporation, Osaka (JP)

( * ) Notice: Subject to any disclaimer, the term of this patent is extended or adjusted under 35 U.S.C. 154(b) by 1310 days.

(21) Appl. No.: 12/064,307

(22) PCT Filed: Aug. 31, 2007

(86) PCT No.: PCT/JP2007/066969
§ 371 (c)(1),
(2), (4) Date: Feb. 20, 2008

(87) PCT Pub. No.: WO2008/029719
PCT Pub. Date: Mar. 13, 2008

(65) Prior Publication Data
US 2009/0317721 A1 Dec. 24, 2009

(30) Foreign Application Priority Data
Sep. 7, 2006 (JP) ................................. 2006 242450

(51) Int. Cl.
*H01M 4/13* (2010.01)
*H01M 4/134* (2010.01)

(52) U.S. Cl. ................. 429/231.95; 429/218.1; 429/238; 429/233

(58) Field of Classification Search .................. None
See application file for complete search history.

(56) References Cited

U.S. PATENT DOCUMENTS

| | | | |
|---|---|---|---|
| 5,683,834 A * | 11/1997 | Fujimoto et al. | 429/221 |
| 2001/0012588 A1 | 8/2001 | Kaido et al. | |
| 2005/0058904 A1 * | 3/2005 | Kano et al. | 429/231.4 |
| 2005/0074671 A1 * | 4/2005 | Sugiyama et al. | 429/231.95 |
| 2006/0024586 A1 * | 2/2006 | Tamura et al. | 429/337 |

FOREIGN PATENT DOCUMENTS

| | | |
|---|---|---|
| JP | 4-12471 | 1/1992 |
| JP | 6-76819 | 3/1994 |
| JP | 6-290774 | 10/1994 |
| JP | 8-130035 | 5/1996 |

(Continued)

OTHER PUBLICATIONS

Japanese Office Action issued in Japanese Patent Application No. 2007-558369, mailed May 31, 2011.

*Primary Examiner* — Keith Walker
(74) *Attorney, Agent, or Firm* — McDermott Will & Emery LLP

(57) ABSTRACT

A non-aqueous electrolyte secondary battery has at least negative electrode, a positive electrode, and a separator between the positive electrode and negative electrode. Negative electrode has columnar first negative electrode active materials that are discretely formed on the outer peripheral surface of negative electrode current collector in the winding direction and can reversibly insert and extract lithium ions, and columnar second negative electrode active materials discretely formed on the inner peripheral surface. The positive electrode has positive electrode mixture layers containing a positive electrode active material capable of reversibly inserting and extracting lithium ions, on both surfaces of a positive electrode current collector. The difference between the porosity generated between first negative electrode active materials in negative electrode and that generated between the second negative electrode active materials in winding is set within 1.1%.

15 Claims, 8 Drawing Sheets

FOREIGN PATENT DOCUMENTS

| | | | |
|---|---|---|---|
| JP | 08-130035 A | 5/1996 | |
| JP | 10-064522 | 3/1998 | |
| JP | 10-064522 A | 3/1998 | |
| JP | 2002-313319 | 10/2002 | |
| JP | 2002-313345 | 10/2002 | |
| JP | 2002-313345 A | 10/2002 | |
| JP | 2002313319 A | * | 10/2002 |
| JP | 2004-031217 | 1/2004 | |
| JP | 2004-031217 A | 1/2004 | |
| JP | 2004031217 A | * | 1/2004 |
| JP | 2004-296103 | 10/2004 | |
| JP | 2004-296103 A | 10/2004 | |
| JP | 2004-319469 A | 11/2004 | |
| JP | 2005-100959 A | 4/2005 | |
| JP | 2006-92748 | 4/2006 | |
| JP | 2006-092748 A | 4/2006 | |

* cited by examiner

4

NON-AQUEOUS BATTERY WITH COLUMNAR ACTIVE MATERIAL

RELATED APPLICATIONS

This application is the U.S. National Phase under 35 U.S.C. §371 of International Application No. PCT/JP2007/066969, filed on Aug. 31, 2007, which in turn claims the benefit of Japanese Patent Application No. JP 2006-242450, filed on Sep. 7, 2006, the disclosures of which Applications are incorporated by reference herein.

TECHNICAL FIELD

The present invention relates to a cylindrical non-aqueous electrolyte secondary battery, and more particularly to a structure of a negative electrode thereof.

BACKGROUND ART

With the advancement of portable and cordless electronic instruments, secondary batteries that are smaller in size, lighter in weight, higher in energy density and contain nickel hydrogen and lithium ions have received attention as a power supply for driving them.

Regarding a nickel hydrogen secondary battery, in order to increase the energy density, the porosity of spongy metal is increased by increasing the active material density or thickness of the electrode plate. Especially, in a cylindrical secondary battery, the electrode plate is wound, and hence the electrode plate cracks or breaks in a winding process.

An example is disclosed where the active material density on the outer peripheral side of the electrode plate of a cylindrical battery is made lower than that on the inner peripheral side (for example, patent document 1). Here, the cylindrical battery has an active material support body made of strip spongy metal and an active material layer formed in the active material support body. According to patent document 1, since the active material density on the outer peripheral side is lower, the flexibility during winding is increased and crack or breakage hardly occurs.

Regarding a lithium ion secondary battery, a non-aqueous electrolyte secondary battery is presently in actual use where the negative electrode current collector employs a negative electrode having a negative electrode mixture layer including a negative electrode active material made of graphite material. Generally, the negative electrode is manufactured by coating metal foil as the negative electrode current collector with negative electrode mixture paste, which contains a negative electrode active material, conductive agent, and binder, and by drying them. The negative electrode after drying is often increased in density by rolling to adjust its thickness to a predetermined thickness. The secondary battery is produced by winding the negative electrode and a positive electrode via a separator. However, the theoretical capacity density of the secondary battery is 372 mAh/g (833 mAh/cm$^3$), and further increase in energy density is required.

Recently, as the negative electrode active material whose theoretical capacity density exceeds 833 mAh/cm$^3$, silicon (Si), tin (Sn), germanium (Ge), an oxide thereof, and an alloy thereof which can form alloys with lithium have been studied. In particular, silicon-containing particles such as silicon particles and silicon oxide particles have been widely studied because they are less expensive.

However, the volumes of these materials increase when they insert lithium ions. For instance, when a negative electrode having an active material made of Si is used, the negative electrode active material in the maximally inserted state of lithium ions is expressed by $Li_{4.4}Si$. The volume increase rate is 4.12 when the state changes from Si to $Li_{4.4}Si$.

Insertion and extraction of lithium ions cause expansion and contraction of the negative electrode active material. During repeating the charge-discharge cycle, reduction in adhesiveness of the negative electrode active material to the negative electrode current collector can cause peeling or the like.

For addressing such a problem, an example is disclosed where a thin film of a negative electrode active material having an inverse pyramidal structure having a gap is formed near the surface of a negative electrode current collector having the irregular surface, expansion stress is reduced, and the current collecting property is secured (for example, patent document 2).

However, the secondary battery of patent document 1 cannot provide a predetermined capacity, because the active material densities on the outer peripheral side and the inner peripheral side of an electrode plate of the battery are different from each other. Furthermore, compression stress occurring on the inner peripheral side in winding makes the amount of supply electrolyte on the inner peripheral side smaller than that of electrolyte supplied to the active material on the outer peripheral side, so that the capacity further decreases disadvantageously.

In a secondary battery having a negative electrode active material made of graphite, also, expansion and contraction of about 1.2 times are caused by charge and discharge. Especially, in an electrode group formed by winding a negative electrode and a positive electrode via a separator, a negative electrode mixture layer on the inner peripheral side of a negative electrode current collector receives compression stress, and a negative electrode mixture layer on the outer peripheral side receives tensile stress. When strain stress due to the expansion and contraction of the negative electrode active material during the charge and discharge is applied to this state, strain occurs in the negative electrode mixture layer. As a result, a conductive network in the negative electrode mixture layer crashes, the negative electrode mixture layer peels from the negative electrode current collector, the facing state of the positive electrode to the negative electrode is made non-uniform, and hence the cycle characteristic degrades disadvantageously.

However, generally, the strain of the negative electrode mixture layer is reduced by a binder or conductive agent existing around the negative electrode active material, so that the cycle characteristic does not sharply degrade.

Since the negative electrode mixture layer is compressed on the inner peripheral side of the negative electrode current collector and is stretched on the outer peripheral side by winding, the density of the negative electrode active material facing the positive electrode mixture layer varies between the inner peripheral side and the outer peripheral side. Thus, the insertion and extraction amount of lithium ions varies between facing the positive electrode mixture layer and negative electrode mixture layer, so that the lithium ions cannot be effectively used disadvantageously.

Due to the compression on the inner peripheral side of the negative electrode current collector and the stretch on the outer peripheral side by winding, the porosity of the negative electrode mixture layer varies between the inner peripheral side and the outer peripheral side. Therefore, the difference between the amounts of non-aqueous electrolytes containing the lithium ions restricts the battery capacity disadvantageously.

In the non-aqueous electrolyte secondary battery of patent document 2, also, the density and porosity of the negative electrode active material vary by winding between the inner peripheral side and the outer peripheral side of the negative electrode current collector. Therefore, the battery capacity achievable in a planar structure without winding cannot be obtained disadvantageously. Especially, in the negative electrode active material such as silicon-containing particles whose expansion-contraction ratio is large, larger strain occurs on the inner peripheral side. Therefore, only a non-aqueous electrolyte secondary battery having extremely low cycle characteristic and reliability can be achieved.

[Patent document 1] Japanese Patent Unexamined Publication No. H06-76819

[Patent document 2] Japanese Patent Unexamined Publication No. 2002-313319

SUMMARY OF THE INVENTION

A non-aqueous electrolyte secondary battery of the present invention has at least the following elements:

a negative electrode having columnar first negative electrode active materials that are formed on the outer peripheral surface of a negative electrode current collector in the winding direction so as to reversibly insert and extract lithium ions, and having columnar second negative electrode active materials that are formed on the inner peripheral surface;

a positive electrode having positive electrode mixture layers containing a positive electrode active material capable of reversibly inserting and extracting lithium ions, on both surfaces of a positive electrode current collector; and a separator between the positive electrode and negative electrode in a state facing to them.

The difference between the porosity generated between the first negative electrode active materials in the negative electrode and the porosity generated between the second negative electrode active materials in winding is set within 1.1%.

Thanks to this structure, the amounts of non-aqueous electrolytes coming into contact with the negative electrode active materials on the inner peripheral surface and outer peripheral surface of the negative electrode can be equalized. Therefore, the inserted and extracted lithium ions can be effectively used, and a non-aqueous electrolyte secondary battery of high reliability can be achieved.

Figure 1:
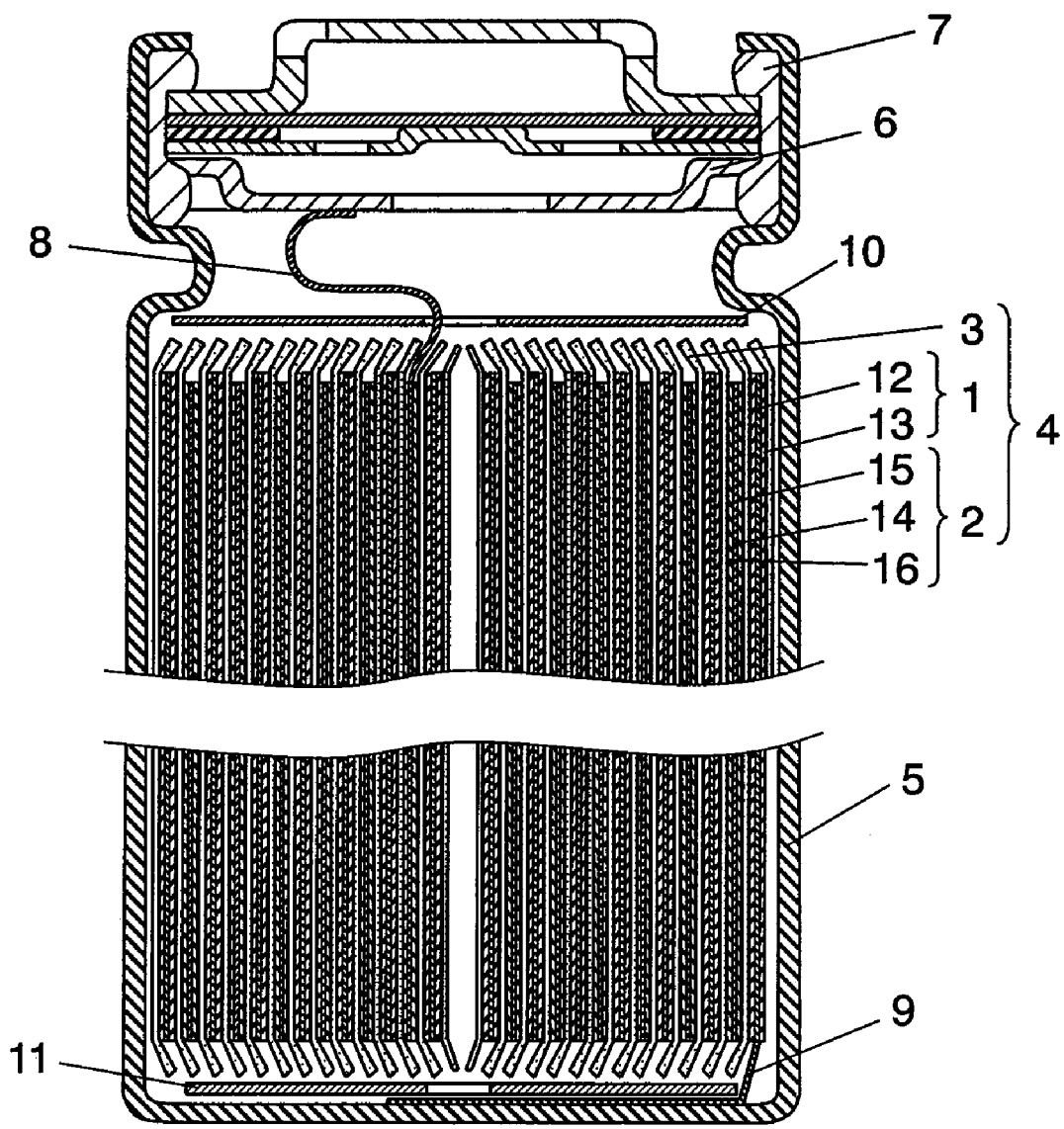
FIG. 1 is a sectional view of a non-aqueous electrolyte secondary battery in accordance with a first exemplary embodiment of the present invention.

REFERENCE MARKS IN THE DRAWINGS 1, 51 positive electrode
2, 32, 62 negative electrode
3 separator
4 electrode group
5 battery case
6 sealing plate
7 gasket
8 positive electrode lead
9 negative electrode lead
10, 11 insulating plates
12, 52 positive electrode current collector
13, 53, 54 positive electrode mixture layer
14, 34, 64 negative electrode current collector 15, 35, 65 first negative electrode active material
15a, 16a, 35a, 36a, 65a, 66a space
16, 36, 66 second negative electrode active material
20 first deposition mask
22 second deposition mask

DETAILED DESCRIPTION OF PREFERRED EMBODIMENTS

Exemplary embodiments of the present invention will be described hereinafter with reference to drawings. The present invention is not limited to the following contents except for its fundamental features described in this description.

First Exemplary Embodiment

Figure 2:
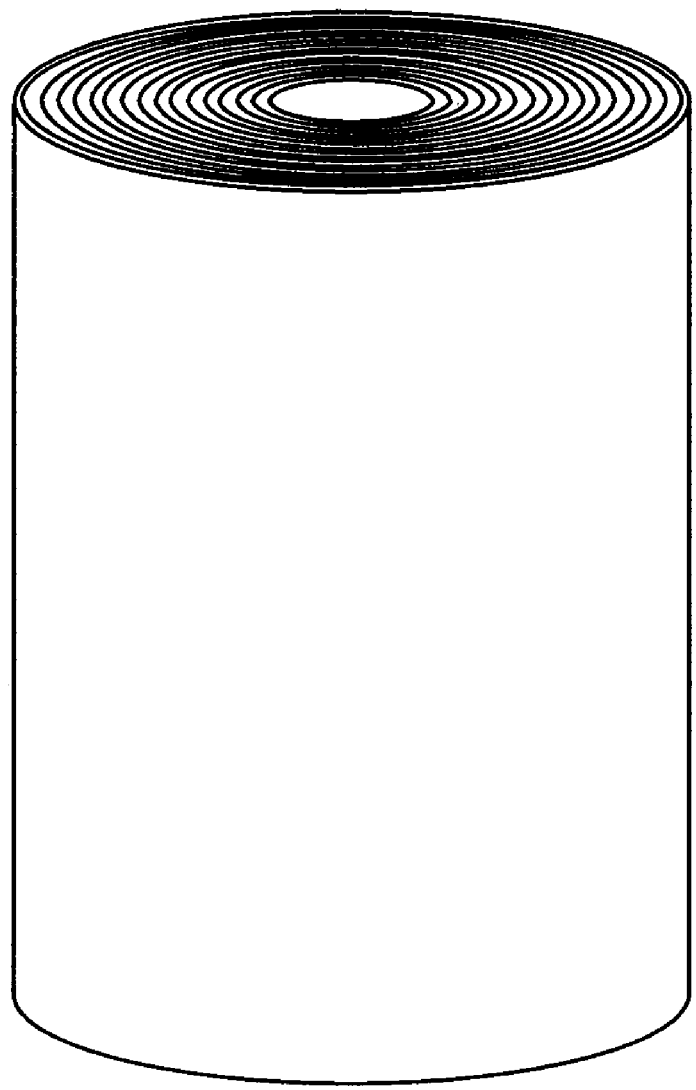
FIG. 2 is a perspective view of an electrode group of the non-aqueous electrolyte secondary battery in accordance with the first exemplary embodiment.

FIG. 1 is a sectional view of a non-aqueous electrolyte secondary battery in accordance with a first exemplary embodiment of the present invention. FIG. 2 is a perspective view of an electrode group of the non-aqueous electrolyte secondary battery in accordance with the first exemplary embodiment.

As shown in FIG. 1, a cylindrical non-aqueous electrolyte secondary battery (hereinafter referred to as "battery") has electrode group 4. As shown in FIG. 2, electrode group 4 is formed by winding, via separator 3, positive electrode 1 that has positive electrode lead 8 made of aluminum or the like, for example, and reduces lithium ions during discharge, and negative electrode 2 that faces positive electrode 1 and has negative electrode lead 9 made of copper or the like at its one end. Insulating plates 10 and 11 are mounted on the upside and downside of electrode group 4, the other end of positive electrode lead 8 is welded to sealing plate 6, the other end of negative electrode lead 9 is welded to the bottom of battery case 5, and electrode group 4 is inserted into battery case 5. The non-aqueous electrolyte (not shown) for conducting lithium ions is injected into battery case 5, and the opening end of battery case 5 is crimped onto sealing plate 6 via gasket 7. Positive electrode 1 has positive electrode current collector 12 and positive electrode mixture layer 13 including a positive electrode active material.

Negative electrode 2 has negative electrode current collector 14, columnar first negative electrode active material 15 disposed on the outer peripheral side thereof in winding, and columnar second negative electrode active material 16 disposed on the inner peripheral side, as described in detail below.

Positive electrode mixture layer 13 contains, as a positive electrode active material, a lithium-containing complex oxide such as $LiCoO_2$, $LiNiO_2$, $LiMn_2O_4$, a mixture of them, or a complex compound of them. Examples of the positive electrode active material include, in addition to these compounds, olivine-type lithium phosphate expressed by general formula $LiMPO_4$ (M=V, Fe, Ni, or Mn), and lithium fluorophosphate expressed by a general formula $Li_2MPO_4F$ (M=V, Fe, Ni, or Mn). Part of the constituent elements of these lithium-containing compounds may be replaced by a different element. The surfaces of these lithium-containing compounds may be treated with metal oxide, lithium oxide, a conductive agent or the like, or may be subjected to hydrophobic treatment.

Positive electrode mixture layer 13 further includes a conductive agent and a binder. Examples of the conductive agent include the following materials: graphites such as natural graphite and artificial graphite; carbon blacks such as acetylene black, Ketjen black, channel black, furnace black, lamp black, and thermal black; conductive fibers such as carbon fiber and metal fiber; metal powders of carbon fluoride, aluminum, and the like; conductive whiskers such as zinc oxide and potassium titanate; conductive metal oxides such as titanium oxide; and organic conductive materials such as a phenylene derivative.

Examples of the binder include polyvinylidene fluoride (PVDF), polytetrafluoroethylene, polyethylene, polypropylene, aramid resin, polyamide, polyimide, polyamideimide, polyacrylonitrile, polyacrylic acid, polymethylacrylate ester, polyethylacrylate ester, polyhexylacrylate ester, polymethacrylic acid, polymethyl methacrylate ester, polyethylmethacrylate ester, polyhexyl methacrylate ester, polyvinyl acetate, polyvinylpyrrolidone, polyether, polyethersulfone, hexafluoropolypropylene, styrene-butadiene rubber, and carboxymethyl cellulose. Further other examples of the binder include copolymers containing at least two selected from tetrafluoroethylene, hexafluoroethylene, hexafluoropropylene, perfluoroalkylvinylether, vinylidene fluoride, chlorotrifluoroethylene, ethylene, propylene, pentafluoropropylene, fluoromethylvinylether, acrylic acid, and hexadiene. Alternatively, two or more of these elements can be mixed.

Examples of positive electrode current collector 12 used in positive electrode 1 include aluminum (Al), carbon, and conductive resin. One of these materials may be surface-treated with carbon or the like.

Examples of the non-aqueous electrolyte can include electrolytic solution where a solute is dissolved in an organic solvent, or so-called polymer electrolyte that contains the electrolytic solution and is non-fluidized with polymer molecules. When at least the electrolytic solution is used, preferably, separator 3 is used between positive electrode 1 and negative electrode 2 and is impregnated with the electrolytic solution. Separator 3 is formed of non-woven fabric or micro porous film made of polyethylene, polypropylene, aramid resin, amide-imide, polyphenylene sulfide, or polyimide. The inside or surface of separator 3 may contain a heat-resistant filler such as alumina, magnesia, silica, or titania. Besides separator 3, a heat-resistant layer may be disposed that is made of these heat-resistant fillers and the same binder as that used in positive electrode 1 and negative electrode 2.

The non-aqueous electrolytic material is selected based on oxidation-reduction potential of each active material. Examples of the solute preferably used in the non-aqueous electrolyte include the following materials: $LiPF_6$; $LiBF_4$; $LiClO_4$; $LiAlCl_4$; $LiSbF_6$; $LiSCN$; $LiCF_3SO_3$; $LiN(CF_3CO_2)$; $LiN(CF_3SO_2)_2$; $LiAsF_6$; $LiB_{10}Cl_{10}$; lower aliphatic lithium calboxylate; LiF; LiCl; LiBr; LiI; chloroborane lithium; various borates such as bis(1,2-benzendiolate (2-)-O,O') lithium borate, bis(2,3-naphthalenediolate (2-)-O,O') lithium borate, bis(2,2'-biphenyldiolate (2-)-O,O') lithium borate, and bis(5-fluoro-2-olate-1-benzensulfonic acid-O,O') lithium borate; and various salts generally used in a lithium battery such as $(CF_3SO_2)_2NLi$, $LiN(CF_3SO_2)$ $(C_4F_9SO_2)$, $(C_2F_5SO_2)_2NLi$, or tetraphenyl lithium borate.

The organic solvent for dissolving the salt can include a solvent generally used in a lithium battery, such as one or a mixture of the following materials: ethylene carbonate (EC); propylene carbonate; butylene carbonate; vinylene carbonate; dimethyl carbonate (DMC); diethyl carbonate; ethyl methyl carbonate (EMC); dipropyl carbonate; methyl formate; methyl acetate; methyl propionate; ethyl propionate; dimethoxymethane; γ-butyrolactone; γ-valerolactone; 1,2-diethoxyethane; 1,2-dimethoxyethane; ethoxymethoxyethane; trimethoxymethane; tetrahydrofuran derivatives such as tetrahydrofuran and 2-methyl-tetrahydrofuran; dimethyl sulfoxide; dioxolane derivatives such as 1,3-dioxolane and 4-methyl-1,3-dioxolane; formamide; acetamide; dimethylformamide; acetonitrile; propylnitrile; nitromethane; ethylmonoglyme; triester phosphate; acetate ester; propionate ester; sulfolane; 3-methyl-sulfolane; 1,3-dimethyl-2-imidazolidinone; 3-methyl-2-oxazolidinone; a propylene carbonate derivative; ethyl ether; diethyl ether; 1,3-propane sultone; anisole; and fluorobenzene.

The solvent may further contain an additive such as vinylene carbonate, cyclohexylbenzene, biphenyl, diphenyl ether, vinylethylene carbonate, divinylethylene carbonate, phenylethylene carbonate, diallyl carbonate, fluoroethylene carbonate, catechol carbonate, vinyl acetate, ethylene sulfite, propanesultone, trifluoropropylene carbonate, dibenzofuran, 2,4-difluoroanisole, o-terphenyl, or m-terphenyl.

The non-aqueous electrolyte may be used in the form of solid electrolyte by mixing the solute into one or a mixture of the following polymeric materials: polyethylene oxide; polypropylene oxide; polyphosphazene; polyaziridine; polyethylene sulfide; polyvinyl alcohol; polyvinylidene fluoride; and polyhexafluoropropylene. The solid electrolyte may be used in a gel form by being mixed into the organic solvent. The solid electrolyte may include an inorganic material such as the following material: lithium nitride; lithium halide; lithium oxoate; $Li_4SiO_4$; $Li_4SiO_4$—LiI—LiOH; $Li_3PO_4$—$Li_4SiO_4$; $Li_2SiS_3$; $Li_3PO_4$—$Li_2S$—$SiS_2$; or a phosphorus sulfide compound. When the nonaquaous electrolyte of the gel form is used, it may be disposed instead of the separator between positive electrode 1 and negative electrode 2. Alternatively, the nonaquaous electrolyte of the gel form may be disposed adjacently to separator 3.

Examples of negative electrode current collector 14 of negative electrode 2 can include a metal foil made of stainless steel, nickel, copper, or titanium, or a thin film made of carbon or conductive resin. The negative electrode current collector may also be surface-treated with carbon, nickel, titanium, or the like.

First negative electrode active material 15 and second negative electrode active material 16 of negative electrode 2 can be made of material such as silicon (Si) or tin (Sn) that reversely inserts and extracts lithium ions and has a theoretical capacity density exceeding 833 mAh/cm$^3$. Any of a simple substance, alloy, compound, solid solution, and complex active material containing a silicon-containing material or a tin-containing material can exhibit the advantage of the present invention as long as it has above-mentioned features. Examples of the silicon-containing material can be made of Si or $SiO_x$ (where, $0.05<x<1.95$), or can be made of an alloy, a compound, or a solid solution in which Si is partly replaced with one or more elements selected from the group of B, Mg, Ni, Ti, Mo, Co, Ca, Cr, Cu, Fe, Mn, Nb, Ta, V, W, Zn, C, N, and Sn. Examples of the tin-containing material can include $Ni_2Sn_4$, $Mg_2Sn$, $SnO_x$ ($0<x<2$), $SnO_2$, $SnSiO_3$, and LiSuO.

The negative electrode active materials may be made of one kind of material or a plurality of kind of materials. An example where the negative electrode active materials are made of the plurality of kind of materials is a compound containing Si, oxygen, and nitrogen, or a complex of a plurality of compounds containing Si and oxygen at different component ratios. Among them, $SiO_x$ ($0.3 \leq x \leq 1.3$) is preferable because the discharge capacity density is high and the expansion coefficient during charging is smaller than that of pure Si.

A negative electrode of the non-aqueous electrolyte secondary battery in accordance with the first exemplary embodiment of the present invention is described with reference to FIG. 3A and FIG. 3B.

Figure 3A:
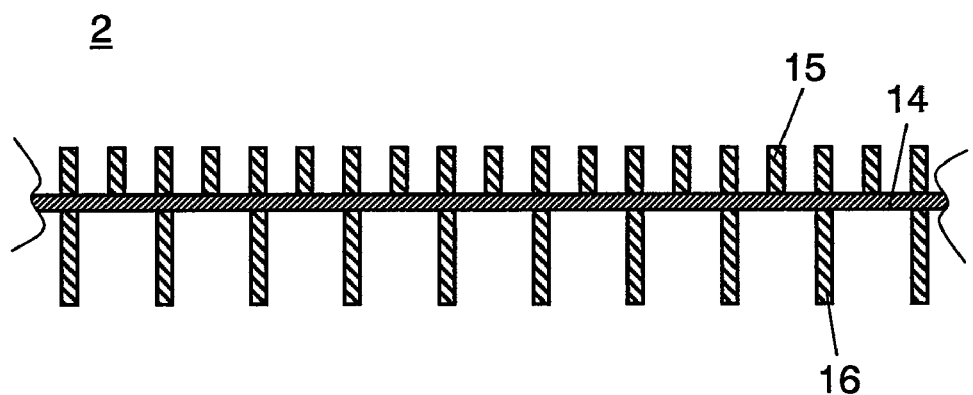
FIG. 3A is a schematic sectional view showing a structure of the winding direction in producing a negative electrode of the non-aqueous electrolyte secondary battery in accordance with the first exemplary embodiment.

FIG. 3A is a schematic sectional view showing a structure of the winding direction in producing the negative electrode of the non-aqueous electrolyte secondary battery in accordance with the first exemplary embodiment. FIG. 3B is a schematic sectional view showing a state when the negative electrode of FIG. 3A is wound.

As shown in FIG. 3A, negative electrode 2 has columnar first negative electrode active materials 15 and second negative electrode active materials 16 in the winding direction on the surface of negative electrode current collector 14 made of copper, for example. Active materials 15 and 16 have the same width, different heights, and are made of silicon (Si), for example. In the direction orthogonal to the winding direction, they may be formed continuously to have the same width as that of the negative electrode current collector, or may be formed discretely or zigzag.

Figure 3B:
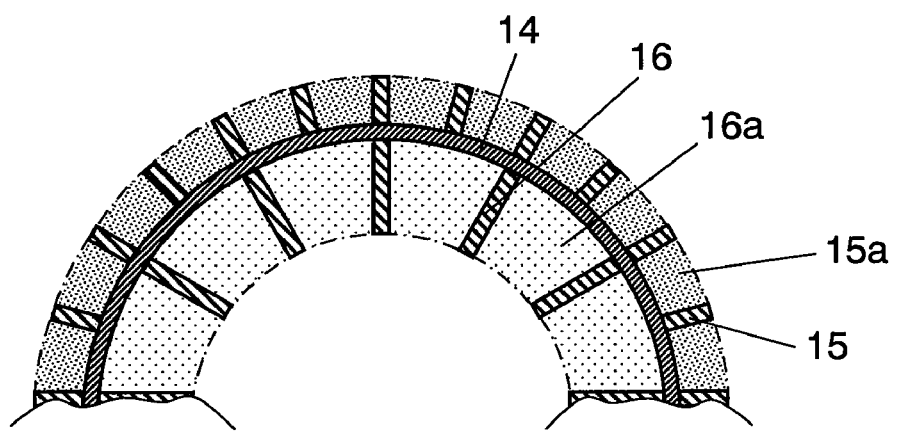
FIG. 3B is a schematic sectional view showing a state when the negative electrode of FIG. 3A is wound.

As shown in FIG. 3B, columnar first negative electrode active materials 15 and second negative electrode active materials 16 are formed so as to substantially equalize the porosity on the outer peripheral side of negative electrode 2 to that on the inner peripheral side thereof in winding. In other words, the porosity in space 15a defined by the interval between first negative electrode active materials 15 and the height of them is substantially equalized to that in space 16a defined by the interval between second negative electrode active materials 16 and the height of them. Further, the capacity density of the first negative electrode active materials is substantially equalized to that of the second negative electrode active materials. Therefore, the height of first negative electrode active materials is made lower than that of second negative electrode active materials in the present embodiment. Thanks to this structure, the porosity on the inner peripheral side of the negative electrode can be substantially equalized to that on the outer peripheral side thereof. Using this electrode plate, a cylindrical battery is produced where the core diameter is 3 mm and the diameter of the electrode group is about 18 mm.

The substantial equalization of the porosity on the outer peripheral side of negative electrode 2 to that on the inner peripheral side thereof indicates the following point. When a usual electrode plate where the amount and density of the active material on the front side are equal to those on the back side is wound, density is reduced on the outer peripheral side in winding and compression stress is applied on the inner peripheral side. Therefore, the porosity on the inner peripheral side differs from that on the outer peripheral side. An electrode plate must be previously produced in consideration of the difference between the porosities. In other words, the electrode group is formed using the electrode plate where the porosity on the inner peripheral side is set larger than that on the outer peripheral side.

Strictly speaking, for equalizing the porosities (densities) of the first negative electrode active material on the outer peripheral side of the electrode group and the second negative electrode active material on the inner peripheral side in winding, the active material amounts must be varied in response to the winding curvature while the shapes or the like of the first and second negative electrode active materials are varied. However, this method is not practical in consideration of the productivity. In the present invention, the following structure is appropriately employed, so that the advantage of the present invention can be obtained without reducing the productivity.

The porosities on the inner peripheral side and outer peripheral side of the negative electrode in winding are described hereinafter. First, it is assumed in the negative electrode before winding that the thickness of the current collector is to, the thickness of the first negative electrode active material on the outer peripheral side is $t_1$, the solid percent per unit volume of the first negative electrode active material is $N_1$, the thickness of the second negative electrode active material on the inner peripheral side is $t_2$, and the solid percent per unit volume of the second negative electrode active material is $N_2$. Here, the solid percent means the volume ratio of the negative electrode active material to the electrode plate volume. When the negative electrode active material is formed as a negative electrode mixture layer similarly to the conventional art, the solid percent means the volume ratio of the negative electrode mixture to the electrode plate volume.

The thickness of each negative electrode active material is sometimes represented as the height in the case of employing the columnar negative electrode active material of the present embodiment of the present invention.

In the wound electrode group, porosity $v_1$ on the outer peripheral side of the current collector and porosity $v_2$ on the inner peripheral side when the radius of the inner peripheral side thereof is assumed to be (r) are expressed by $$v_1 = 2r(1-N_1)/\{2(r+t_0)+t_1\} \quad \text{Eq. 1,}$$

and $$v_2 = 2r(1-N_2)/(2r-t_2) \quad \text{Eq. 2.}$$

Specifically, when the thickness of the current collector is 10 μm, the thickness (height) of both the columnar first and second negative electrode active materials is 30 μm, and the solid percent per unit volume of the active materials is 70%, for example, the porosities on the outer peripheral side and inner peripheral side in the winding innermost periphery are 30.7% and 29.3%, respectively. The difference between the porosities is about 1.4%. The difference between the porosities in the winding outermost periphery is about 0.2%.

When the thickness (height) and width of the columnar first negative electrode active materials are 15 μm and 10 μm, the thickness (height) and width of the columnar second negative electrode active materials are 30 μm and 10 μm, and the solid percent per unit volume is 70%, the porosities on the outer peripheral side and inner peripheral side in the winding innermost periphery are 30.3% and 29.3%, respectively. The difference between the porosities is about 1%. The difference between the porosities in the winding outermost periphery is about 0.2%.

Therefore, instead of a negative electrode where the thickness of the first negative electrode active material is equal to that of the second negative electrode active material, employing a negative electrode where the thickness of the first negative electrode active material is different from that of the second negative electrode active material can reduce the porosity difference by 0.3% in absolute value (23% in ratio).

In other words, the substantial equalization of the porosity on the inner peripheral side of the negative electrode to that on the outer peripheral side thereof indicates that the difference between the porosities is reduced to 1.1% or lower, for example, in the present invention, differently from the porosities when conventional uniform negative electrode active material is used. Therefore, porosity $v_1$ on the outer peripheral side is equal to porosity $v_2$ on the inner peripheral side at a specific winding radius, but porosity $v_1$ is not always equal to porosity $v_2$ in the whole region of the wound electrode group. The porosities can be designed arbitrarily using relational expressions Eq. 1 and Eq. 2 in response to the desired characteristic of the secondary battery.

The densities of the negative electrode active materials on the inner peripheral side and outer peripheral side of the negative electrode can be uniformed regardless of the winding curvature by optimizing the shapes or the like of the columnar negative electrode active materials.

Thus, the porosity difference between the first negative electrode active material and second negative electrode active material formed on the outer peripheral side and inner peripheral side of the negative electrode in winding can be substantially nulled or reduced. The amounts of non-aqueous electrolyte coming into contact with respective negative electrode active materials can be substantially equalized. Since the capacity density of the first negative electrode active material is substantially equal to that of the second negative electrode active material, the amount of inserted lithium ions is substantially equal to that of extracted lithium ions. As a result, the strain due to the expansion and contraction of respective negative electrode active materials on the outer and inner peripheral sides of the negative electrode becomes uniform, and a negative electrode that does not cause peeling or the like is obtained.

In the present embodiment, the negative electrode where the porosity and capacity density are substantially uniformed in winding is employed, so that a non-aqueous electrolyte secondary battery can be achieved that has a uniform non-aqueous electrolyte amount on the inner and outer peripheral sides of the negative electrode, can efficiently insert and extract lithium ions, and has a large capacity.

In the present embodiment, the solid percent per unit volume of the columnar first and second negative electrode active materials is made constant, and the thickness (height) is varied. However, the present invention is not limited to this. The thickness (height) at the position moving from the winding center to the outer periphery may be varied in response to the curvature, for example. In this case, the porosity on the outer peripheral side of the negative electrode can be designed to be substantially equal to that on the inner peripheral side thereof in the whole circumference of the electrode group, so that the characteristic of the secondary battery is improved.

A manufacturing method of a negative electrode of a non-aqueous electrolyte secondary battery in accordance with the present exemplary embodiment of the present invention is described in detail with reference to FIG. 4A through FIG. 4E.

FIG. 4A through FIG. 4E are sectional views illustrating a manufacturing step of the negative electrode of the non-aqueous electrolyte secondary battery in accordance with the first exemplary embodiment.

Figure 4A:
FIG. 4A is a sectional view illustrating a manufacturing step of the negative electrode of the non-aqueous electrolyte secondary battery in accordance with the first exemplary embodiment.

First, for example, 10 μm-thick negative electrode current collector 14 made of copper is prepared as shown in FIG. 4A.

Figure 4B:
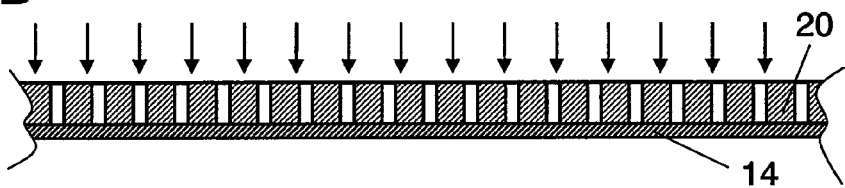
FIG. 4B is a sectional view illustrating the manufacturing step of the negative electrode of the non-aqueous electrolyte secondary battery in accordance with the first exemplary embodiment.

Next, as shown in FIG. 4B, first deposition mask 20 defining a columnar first negative electrode active material is disposed on one surface of negative electrode current collector 14, for example, on the surface positioned on the outer peripheral side in winding. First deposition mask 20 has predetermined openings at predetermined intervals in the winding direction.

Figure 4C:
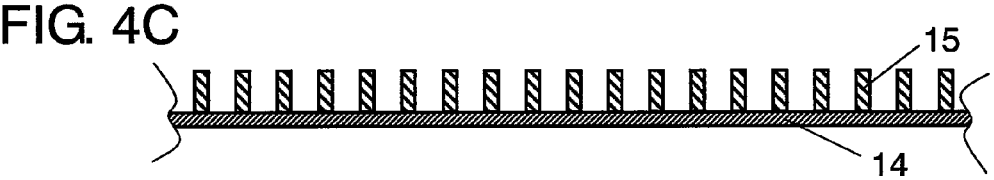
FIG. 4C is a sectional view illustrating the manufacturing step of the negative electrode of the non-aqueous electrolyte secondary battery in accordance with the first exemplary embodiment.

Next, as shown in FIG. 4C, negative electrode current collector 14 having first deposition mask 20 is disposed inside vacuum deposition apparatus. Silicon (Si) is deposited in an oxygen ($O_2$) atmosphere, for example. Thus, first negative electrode active materials 15 made of $SiO_x$ ($0 \leq x \leq 0.3$), for example, are formed in a predetermined columnar shape on one surface of negative electrode current collector 14.

Figure 4D:
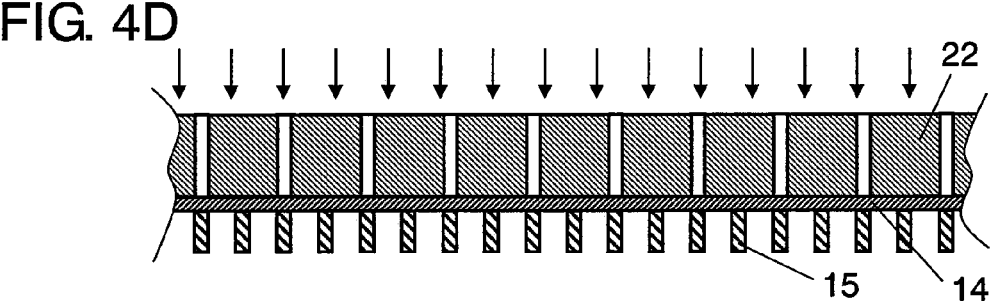
FIG. 4D is a sectional view illustrating the manufacturing step of the negative electrode of the non-aqueous electrolyte secondary battery in accordance with the first exemplary embodiment.

Next, as shown in FIG. 4D, second deposition mask 22 defining a columnar second negative electrode active material is disposed on the other surface of negative electrode current collector 14, for example, on the surface positioned on the inner peripheral side in winding. Negative electrode current collector 14 having second deposition mask 22 is disposed inside vacuum deposition apparatus, for example. Silicon (Si) is deposited in an oxygen ($O_2$) atmosphere, for example. Thus, second negative electrode active materials 16 made of $SiO_x$ ($0 \leq x \leq 0.3$), for example, are formed in a columnar shape at least higher than the first negative electrode active materials on the other surface of negative electrode current collector 14. This structure can be achieved by adjusting the deposition energy and deposition time. The difference of height is determined so that the porosity between the first negative electrode active materials is substantially equal to or smaller than that between the second negative electrode active materials when the negative electrode is wound.

Figure 4E:
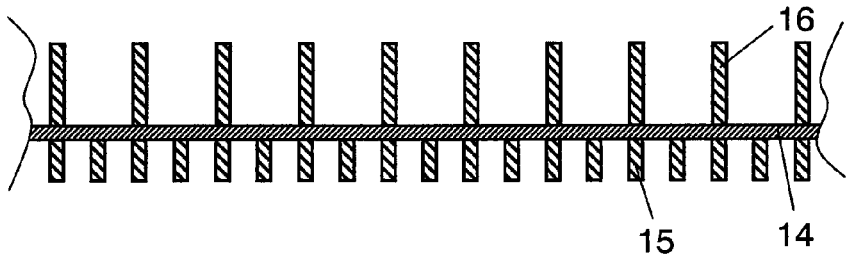
FIG. 4E is a sectional view illustrating the manufacturing step of the negative electrode of the non-aqueous electrolyte secondary battery in accordance with the first exemplary embodiment.

Then, as shown in FIG. 4E, when deposition masks are removed after the deposition, negative electrode 2 having the first negative electrode active materials and second negative electrode active materials having different heights on both surfaces of the negative electrode current collector is produced.

At this time, it is preferable that the intervals and widths are set so that the capacity density of the formed first negative electrode active materials is substantially equal to that of the formed second negative electrode active materials in winding.

As a method of forming each columnar negative electrode active material, a usually used vapor phase method such as an ion plating method, electron beam deposition method, or sputtering method is employed in addition to the above-mentioned method.

Figure 5A:
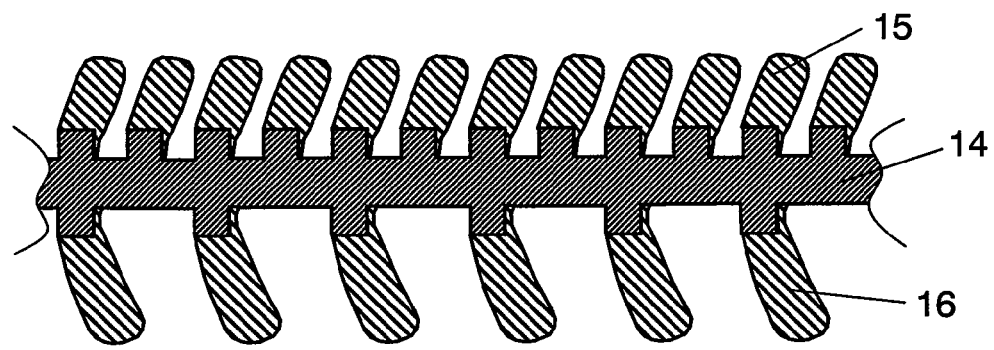
FIG. 5A is a schematic sectional view showing a structure of the winding direction in producing a negative electrode of the non-aqueous electrolyte secondary battery of another example 1 in accordance with the first exemplary embodiment.
Figure 5B:
FIG. 5B is a schematic sectional view showing a structure of the winding direction in producing a negative electrode of the non-aqueous electrolyte secondary battery of another example 2 in accordance with the first exemplary embodiment.
Figure 6A:
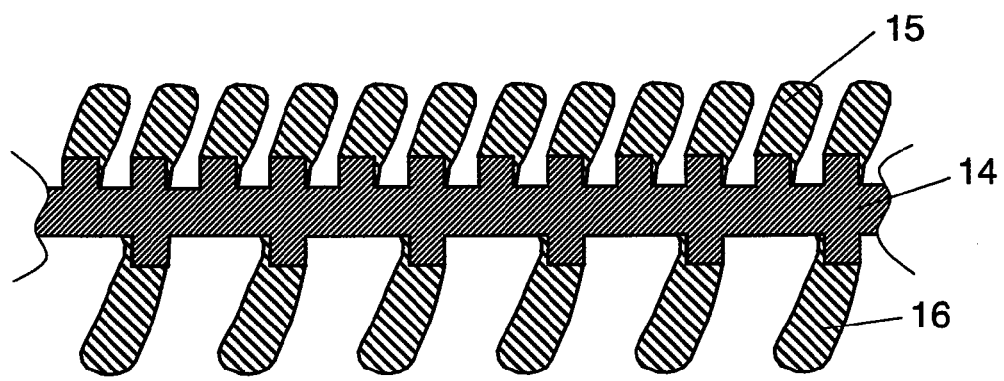
FIG. 6A is a schematic sectional view showing a structure of the winding direction in producing a negative electrode of the non-aqueous electrolyte secondary battery of another example 3 in accordance with the first exemplary embodiment.
Figure 6B:
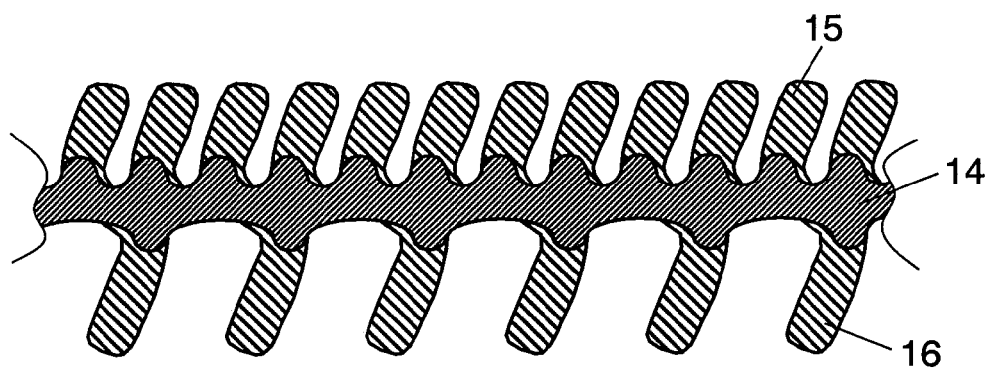
FIG. 6B is a schematic sectional view showing a structure of the winding direction in producing a negative electrode of the non-aqueous electrolyte secondary battery of another example 4 in accordance with the first exemplary embodiment.

In the present embodiment, each negative electrode active material is formed using the deposition mask. However, the present invention is not limited to this. As shown in another example 1 of FIG. 5A, each columnar negative electrode active material may be formed by obliquely performing deposition on a negative electrode current collector having an irregular surface. As shown in another example 2 of FIG. 5B, each columnar negative electrode active material may be formed by obliquely performing deposition on a negative electrode current collector having a wavy surface. As shown in another example 3 of FIG. 6A and another example 4 of FIG. 6B, each first negative electrode active materials and each second negative electrode active materials may be formed in different oblique directions. These oblique columnar negative electrode active materials are grown and formed while the negative electrode active materials are partially shielded by the projecting parts or the like during oblique deposition. Therefore, the deposition mask is not required, and a negative electrode with a simple structure can be produced with high productivity.

In the present embodiment, each negative electrode active material is formed orthogonally to the negative electrode current collector. However, the present invention is not limited to this. For instance, oblique columnar negative electrode active materials shown in FIG. 5A, FIG. 5B, FIG. 6A, and FIG. 6B may be formed by disposing a deposition mask in a separated state from the negative electrode current collector and evaporating silicon or the like obliquely.

In the present embodiment, the negative electrode active materials are formed to have a quadrangular sectional shape. However, the present invention is not limited to this. For instance, the sectional shape may be an arbitrary shape such as trapezoid or inverted trapezoid.

Second Exemplary Embodiment

A negative electrode of a non-aqueous electrolyte secondary battery in accordance with a second exemplary embodiment of the present invention is described hereinafter with reference to FIG. 7A and FIG. 7B. Each structure and material of the secondary battery except negative electrode 32 are similar to those of the first exemplary embodiment, and the descriptions of them are omitted.

Figure 7A:
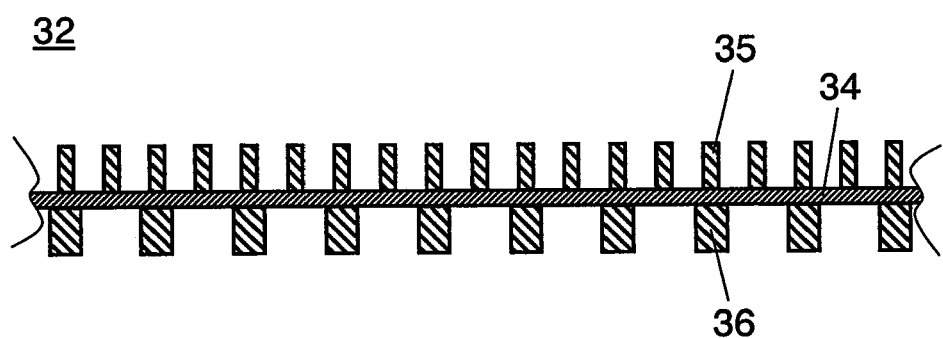
FIG. 7A is a schematic sectional view showing a structure of the winding direction in producing a negative electrode of a non-aqueous electrolyte secondary battery in accordance with a second exemplary embodiment of the present invention.

FIG. 7A is a schematic sectional view showing a structure of the winding direction in producing the negative electrode of the non-aqueous electrolyte secondary battery in accordance with the second exemplary embodiment. FIG. 7B is a schematic sectional view showing the state when the negative electrode of FIG. 7A is wound. Each first negative electrode active material and each second negative electrode active material of the second exemplary embodiment are different from those of the first exemplary embodiment in that the heights of the negative electrode active materials are the same in the winding direction and the width of the winding direction of the second negative electrode active material is made greater.

As shown in FIG. 7A, negative electrode 32 has columnar first negative electrode active materials 35 and columnar second negative electrode active materials 36 on the surfaces of negative electrode current collector 34 made of copper, for example. Active materials 35 and 36 have the same height and different width in the winding direction and are made of silicon (Si) or the like. In the direction orthogonal to the winding direction, the active materials may be continuously formed to have the same width as that of the negative electrode current collector, or may be formed discretely or zigzag.

Figure 7B:
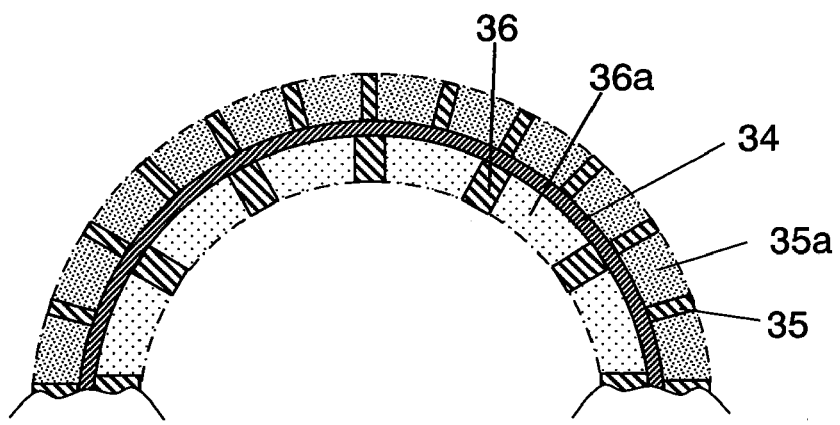
FIG. 7B is a schematic sectional view showing a state when the negative electrode of FIG. 7A is wound.

As shown in FIG. 7B, columnar first negative electrode active materials 35 and columnar second negative electrode active materials 36 are formed so as to substantially equalize the porosity on the outer peripheral side of negative electrode 32 to that on the inner peripheral side thereof in winding. In other words, the porosity in space 35a defined by the interval between first negative electrode active materials 35 and the height of them is substantially equalized to that in space 36a defined by the interval between second negative electrode active materials 36 and the height of them. The capacity density of the first negative electrode active materials is substantially equalized to that of the second negative electrode active materials. Therefore, in the present embodiment, the width of the second negative electrode active materials is made greater than that of first negative electrode active materials. The substantial equalization of the porosities has the same meaning as that of the first exemplary embodiment.

Specifically, for example, when the thickness (height) and width of the columnar first negative electrode active materials are 20 μm and 10 μm, the thickness (height) and width of the columnar second negative electrode active materials are 20 μm and 5 μm, and the solid percent per unit volume is 70%, the porosities on the outer peripheral surface and inner peripheral surface in the winding innermost periphery are 30.5% and 29.5%, respectively. The difference between the porosities is about 1%. The difference between the porosities in the winding outermost periphery is about 0.2%.

Thus, the porosity difference between each first negative electrode active material and each second negative electrode active material formed on the outer peripheral side and inner peripheral side of the negative electrode in winding can be substantially nulled or reduced, and the amounts of non-aqueous electrolyte coming into contact with respective negative electrode active materials can be substantially equalized. Since the density of the first negative electrode active material is substantially equal to that of the second negative electrode active material, the amount of inserted lithium ions is substantially equal to that of extracted lithium ions. As a result, the strain due to the expansion and contraction of respective negative electrode active materials on the outer and inner peripheral sides of the negative electrode becomes uniform, and a negative electrode that does not cause peeling or the like is obtained.

In the present embodiment, the negative electrode where the porosity and capacity density are substantially uniformed in winding is employed, so that a non-aqueous electrolyte secondary battery can be achieved that has uniform non-aqueous electrolyte amount on the inner and outer peripheral sides of the negative electrode, can efficiently insert and extract lithium ions, and has a large capacity. The height of the second negative electrode active material can be reduced, so that the thickness of the negative electrode can be reduced. Therefore, the number of winding turns is increased, the area of the negative electrode facing the positive electrode is enlarged, and hence a secondary battery having higher capacity can be achieved.

Third Exemplary Embodiment

A non-aqueous electrolyte secondary battery in accordance with a third exemplary embodiment of the present invention is described hereinafter with reference to FIG. 8A and FIG. 8B. Each structure and material of the secondary battery except negative electrode 62 and positive electrode 51 are similar to those of the first exemplary embodiment, and the descriptions of them are omitted.

Figure 8A:
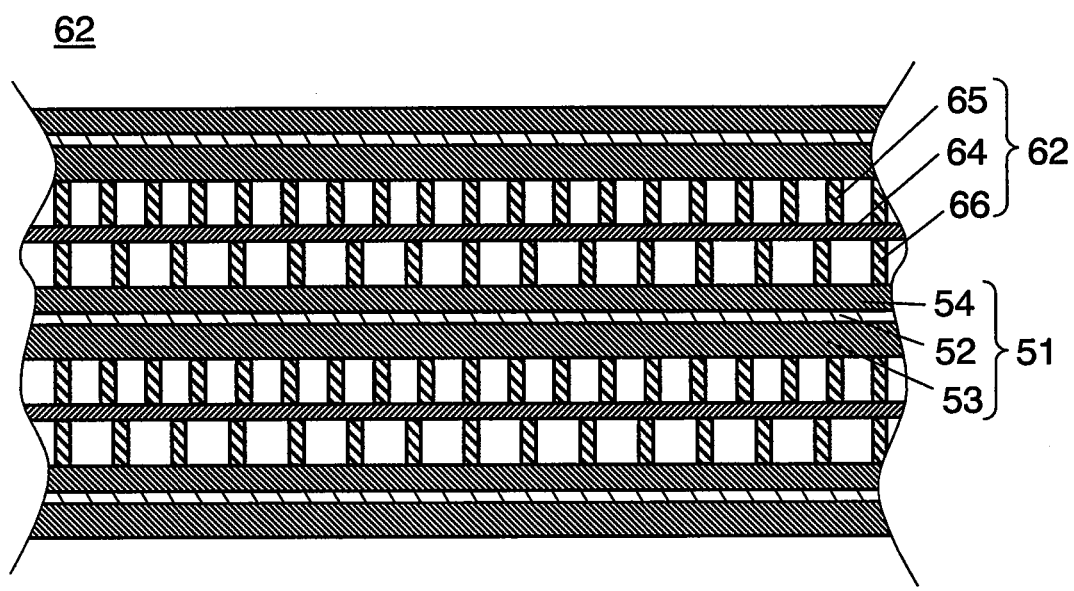
FIG. 8A is a schematic sectional view showing a structure of a negative electrode and a positive electrode in the winding direction of a non-aqueous electrolyte secondary battery in accordance with a third exemplary embodiment of the present invention.

FIG. 8A is a schematic sectional view showing a structure of the negative electrode and the positive electrode in the winding direction of the non-aqueous electrolyte secondary battery in accordance with the third exemplary embodiment of the present invention. FIG. 8B is a partial sectional view of FIG. 8A for schematically showing a state when the negative electrode and the positive electrode are wound. In FIG. 8A and FIG. 8B, for sake of simplicity, the separator is not drawn.

In the third exemplary embodiment, each columnar first negative electrode active material and each columnar second negative electrode active material have the same height and width and a different forming interval in the winding direction, so that the porosities in winding are substantially equalized. Therefore, in the negative electrode, the capacity densities of the negative electrode active materials on the inner and outer peripheral sides in winding are different from each other. Therefore, the capacity density of the positive electrode active material in the positive electrode mixture layer forming the positive electrode is substantially equalized to that of the first negative electrode active materials and second negative electrode active materials of the negative electrode facing it. Specifically, the thicknesses of the positive electrode mixture layers on the inner and outer peripheral sides of the positive electrode are different from each other, and the capacity densities thereof are also different from each other.

As shown in FIG. 8A, negative electrode 62 has columnar first negative electrode active materials 65 and columnar second negative electrode active materials 66 on the surfaces of negative electrode current collector 64 made of copper, for example. Active materials 65 and 66 have the same height and the same width, are formed at different intervals in the winding direction, and are made of silicon (Si) or the like. In the direction orthogonal to the winding direction, the negative electrode active materials may be continuously formed to have the same width as that of the negative electrode current collector, or may be formed discretely or zigzag.

Figure 8B:
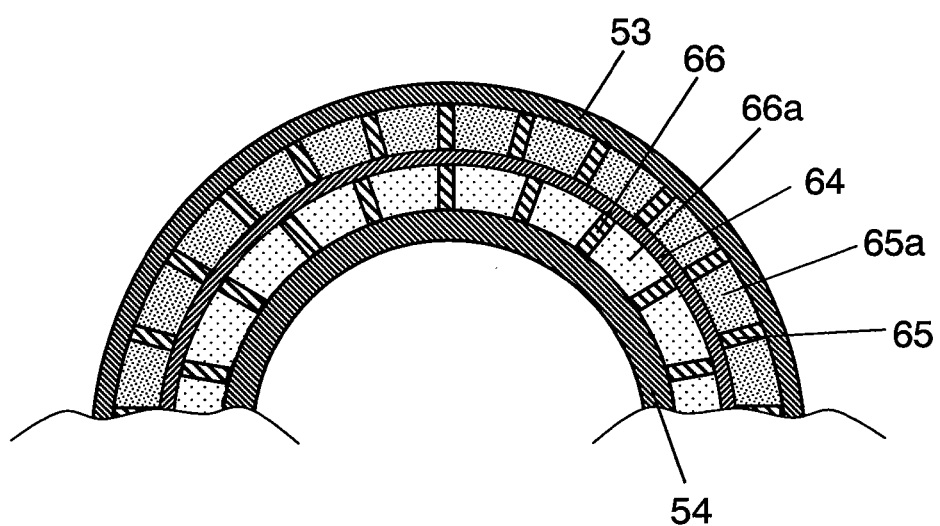
FIG. 8B is a partial sectional view of FIG. 8A for schematically showing a state when the negative electrode and the positive electrode are wound.

As shown in FIG. 8B, columnar first negative electrode active materials 65 and columnar second negative electrode active materials 66 are formed so as to substantially equalize the porosity on the outer peripheral side of negative electrode 62 to that on the inner peripheral side thereof in winding. In other words, the porosity in space 65a defined by the interval between first negative electrode active materials 65 and the height of them is substantially equalized to that in space 66a defined by the interval between second negative electrode active materials 66 and the height of them. At this time, the capacity density of the first negative electrode active materials cannot be equalized to that of the second negative electrode active materials.

In the present embodiment, the capacity density of first negative electrode active materials 65 is substantially equalized to that of the positive electrode active material in positive electrode mixture layer 53 of positive electrode 51 facing first negative electrode active materials 65. The capacity density of second negative electrode active materials 66 is substantially equalized to that of the positive electrode active material in positive electrode mixture layer 54 of positive electrode 51 facing second negative electrode active materials 66. Specifically, the substantial equalization is by varying the thicknesses of positive electrode mixture layers 53 and 54 formed on both surfaces of positive electrode current collector 52 of positive electrode 51.

Specifically, for example, when the thickness and width of the columnar first negative electrode active materials are 20 μm and 10 μm, the thickness and width of the columnar second negative electrode active materials are 20 μm and 10 μm, the solid percent per unit volume of the first negative electrode active materials is 70%, and the solid percent per unit volume of the second negative electrode active materials is 69%, both the porosities on the outer peripheral surface and inner peripheral surface in the winding innermost periphery are 30.5%. The difference between the porosities in the winding outermost periphery is about 0.8%.

At this time, the thickness of the positive electrode mixture layer facing the first negative electrode active materials is 60 μm, and the thickness of the positive electrode mixture layer facing the second negative electrode active materials is 58 μm.

The positive electrode mixture layers having different thickness lying on the inner and outer peripheries of the positive electrode are produced by the following method.

First, 93 parts by weight of LiCoO$_2$ powder as the positive electrode active materials is mixed with 4 parts by weight of acetylene black as a conductive agent, for example.

Next, N-methyl-2-pyrrolidone (NMP) solution (part number #1320 manufactured by Kureha Corporation) of polyvinylidene fluoride (PVDF) as a binder is mixed into the produced powder so that the weight of the PVDF is 3 parts by weight.

Next, an appropriate amount of NMP is added to the obtained mixture, thereby preparing paste for the positive electrode mixture. The prepared paste for the positive electrode mixture as much as the amount equivalent to the capacity density of the first negative electrode active materials is applied to the positive electrode current collector (thickness: 15 μm) made of aluminum (Al) foil using a doctor blade method, and is dried. Further, the amount equivalent to the capacity density of the second negative electrode active materials is applied to the rear surface, and is dried.

The produced matter is rolled so that the thickness of the positive electrode mixture layer facing the first negative electrode active materials is 60 μm, the thickness of the positive electrode mixture layer facing the second negative electrode active materials is 58 μm, and the whole thickness is 129 μm, for example. The rolled matter is cut into a predetermined size, thereby producing a positive electrode.

Thus, the porosity difference between each first negative electrode active material and each second negative electrode active material formed on the outer peripheral side and inner peripheral side of the negative electrode in winding can be substantially nulled or reduced, and the amounts of non-aqueous electrolyte coming into contact with respective negative electrode active materials can be substantially equalized. Since the positive electrode mixture layers that face the first negative electrode active material and second negative electrode active material and have capacity densities substantially equal to those of them, respectively, the amount of lithium ions inserted between the facing positive electrode and negative electrode becomes equal to that of lithium ions extracted between them. As a result, the lithium ions can be effectively used.

In the present embodiment, negative electrode active materials of high expansion and contraction can be used, and a non-aqueous electrolyte secondary battery of high capacity capable of efficiently inserting and extracting lithium ions is produced.

In the present embodiment, the solid percent of the first negative electrode active material or second negative electrode active material is constant in the whole circumference of the negative electrode. However, the solid percent may be varied in response to the curvature in winding. Thus, the productivity reduces, but the porosity on the outer peripheral side of the negative electrode can be substantially equalized to that on the inner peripheral side in the whole circumference in winding. The strain during expansion and contraction on the outer peripheral side and inner peripheral side of the negative electrode can be uniformed, so that the secondary battery of high reliability is produced.

Specific embodied examples in each exemplary embodiment of the present invention are described hereinafter.

Embodied Example 1

In embodied example 1, a negative electrode in accordance with the first exemplary embodiment and a secondary battery including the negative electrode are produced.

A negative electrode capable of inserting and extracting lithium ions is produced in the following method. At this time, as a negative electrode active material capable of inserting and extracting lithium ions, silicon oxide ($SiO_x$) produced by vacuum-depositing silicon (Si) in an oxygen atmosphere is used.

First, columnar first negative electrode active materials (width: 10 μm, thickness: 15 μm, solid percent: 70%) and columnar second negative electrode active materials (width: 10 μm, thickness: 30 μm, solid percent: 70%) are produced using deposition masks on both surfaces of negative electrode current collector (thickness: 10 μm) made of copper foil. At this time, the first negative electrode active materials are formed on the deposition condition that the oxygen amount is 30 sccm, the deposition rate is 2 μm/min., and the electron gun output is 7 kW. The second negative electrode active materials are formed on the deposition condition that the oxygen amount is 30 sccm, the deposition rate is 1 μm/min, and the electron gun output is 7 kW.

Then, an exposed part of 30 mm is disposed on the inner peripheral side of the negative electrode and in Cu foil that does not face the positive electrode, and a negative electrode lead made of Cu is welded to the exposed part.

A positive electrode having a positive electrode active material capable of inserting and extracting lithium ions is produced in the following method.

First, 93 parts by weight of $LiCoO_2$ powder as the positive electrode active material is mixed with 4 parts by weight of acetylene black as a conductive agent. N-methyl-2-pyrrolidone (NMP) solution (part number #1320 manufactured by Kureha Corporation) of polyvinylidene fluoride (PVDF) as a binder is mixed into the powder so that the weight of the PVDF is 3 parts by weight. An appropriate amount of NMP is added to the obtained mixture, thereby preparing paste for the positive electrode mixture. The prepared paste for the positive electrode mixture is applied to the positive electrode current collector (thickness: 15 μm) made of aluminum (Al) foil using a doctor blade method, is rolled so that the density of the positive electrode mixture layer is 3.5 g/cc and the thickness is 129 μm, and is sufficiently dried at 85° C. The dried matter is cut into a width of 57 mm and a length of 600 mm, thereby producing a positive electrode. An exposed part of 30 mm is disposed on the inner peripheral side of the positive electrode and in Al foil that does not face the negative electrode, and a positive electrode lead made of Al is welded to the exposed part.

The produced negative electrode and positive electrode are wound via a 20 μm thick separator made of polypropylene, thereby forming an electrode group. The obtained electrode group is inserted into a battery case (material: iron/Ni-plated, diameter: 18 mm, height: 65 mm) for cylindrical battery having only one opening side, an insulating plate is disposed between the battery case and the electrode group, the negative lead is welded to the battery case, and then the positive lead is welded to a sealing plate, thereby producing a battery.

This battery is heated to 60° C. in vacuum and dried, then 5.8 g of electrolyte that is produced by dissolving 1.2 mol/$dm^3$ of $LiPF_6$ in a non-aqueous solvent containing ethylene carbonate (EC), dimethyl carbonate (DMC), and ethyl methyl carbonate (EMC) at volume ratio of 2:3:3 is injected, and the sealing plate is sealed by crimping by the battery case, thereby producing a non-aqueous electrolyte secondary battery. This non-aqueous electrolyte secondary battery is called sample 1.

Embodied Example 2

In embodied example 2, a negative electrode in accordance with the second exemplary embodiment and a secondary battery including the negative electrode are produced.

The non-aqueous electrolyte secondary battery is produced in a method similar to that of embodied example 1 except that columnar first negative electrode active materials (width: 10 μm, thickness: 20 μm, solid percent: 70%) and columnar second negative electrode active materials (width: 5 μm, thickness: 20 μm, solid percent: 70%) are formed on both surfaces of negative electrode current collector (thickness: 10 μm) made of copper foil. This non-aqueous electrolyte secondary battery is called sample 2.

Embodied Example 3

In embodied example 3, a negative electrode and positive electrode in accordance with the third exemplary embodiment and a secondary battery including them are produced.

The secondary battery is produced in a method similar to that of embodied example 1 except that columnar first negative electrode active materials (width: 10 μm, thickness: 20 μm, solid percent: 70%) and columnar second negative electrode active materials (width: 10 μm, thickness: 20 μm, solid percent: 69%) are formed on both surfaces of negative electrode current collector (thickness: 10 μm) made of copper foil.

Using the manufacturing method having been described in the third embodiment, an electrode plate is produced where the thickness of the positive electrode mixture layer facing the first negative electrode active materials is 60 μm, the thickness of the positive electrode mixture layer facing the second negative electrode active materials is 58 μm, and the whole thickness is 129 μm. The electrode plate is cut into a width of 57 mm and a length of 600 mm to form the positive electrode. An exposed part of 30 mm is disposed on the inner peripheral side of the positive electrode and in Al foil that does not face the negative electrode, and a positive lead made of Al is welded to the exposed part.

Using the produced negative electrode, a non-aqueous electrolyte secondary battery is produced in the method similar to that of embodied example 1. This non-aqueous electrolyte secondary battery is called sample 3.

Comparative Example 1

A non-aqueous electrolyte secondary battery is produced in a method similar to that of embodied example 1 except that the negative electrode is formed by disposing columnar negative electrode active materials having a solid percent of 70%, the same height, the same width, and the same interval on both sides of the negative electrode current collector. This secondary battery is called sample C1.

Each produced non-aqueous electrolyte secondary battery is evaluated as follows.

(Measurement of Battery Capacity)

Each non-aqueous electrolyte secondary battery is charged and discharged at an ambient temperature of 25° C. First, charge is performed at a constant current of 0.7 C hour rate to design capacity (2800 mAh) until the battery voltage becomes 4.2 V, and constant voltage charge of attenuating the current to a value of 0.05 C hour rate at a constant voltage of 4.2 V is performed. After that, a rest of 30 minutes is taken.

Then, discharge is performed at a constant current of 0.2 C hour rate until the battery voltage decreases to 2.5 V. The discharge capacity at this time is set as the battery capacity (or initial capacity).

(Capacity Retaining Ratio)

Each produced non-aqueous electrolyte secondary battery is repeatedly charged and discharged at an ambient temperature of 25° C. on the following condition.

First, charge is performed at a constant current of 0.5 C hour rate to design capacity (2800 mAh) until the battery voltage becomes 4.2 V, and charge is performed at a constant voltage of 4.2 V until the charge current decreases to a value of 0.05 C hour rate. After that, a rest of 30 minutes is taken.

Then, discharge is performed at a constant current of 1.0 C hour rate until the battery voltage decreases to 2.5 V. After that, a rest of 30 minutes is taken.

The above-mentioned charge-discharge cycle is set to be one cycle, and repeated 100 times. The ratio of the discharge capacity of 100th cycle to that of first cycle is defined as the capacity retaining ratio (%). In other words, as the capacity retaining ratio approaches 100, the charge-discharge cycle characteristic becomes high.

(Measurement of Group Diameter of Electrode Group)

First, the buckling situation of the electrode group is recognized in a full charge state by computed-tomography (CT)-scanning the battery having undergone the charge-discharge cycle.

The group diameter of the electrode group is measured by processing the CT scan image. At this time, first, a secondary battery where the group diameter of the electrode group is 17.50 mm is selected and evaluated.

Specifications and evaluation results of sample 1 through sample 3 and sample C1 are shown in Table 1.

TABLE 1

| | Specifications | | Evaluation results | | |
| --- | --- | --- | --- | --- | --- |
| | Porosity | Porosity | | After 100 cycles | |
| | difference in innermost periphery [%] | difference in outermost periphery [%] | Initial capacity [mAh] | Capacity retaining ratio [%] | Group diameter [mm] |
| Sample 1 | 1.1 | 0.2 | 2803 | 87 | 17.61 |
| Sample 2 | 1 | 0.2 | 2785 | 89 | 17.54 |
| Sample 3 | 0 | 0.8 | 2721 | 89 | 17.52 |
| Sample C1 | 1.4 | 0.2 | 2787 | 81 | 17.68 |

As shown in Table 1, there is not remarkable difference in the initial capacity among sample 1 through sample 3 and sample C1. As the porosity difference between the inner peripheral side and outer peripheral side of the negative electrode is decreased, the cycle characteristic such as the capacity retaining ratio or variation in group diameter is improved. As the porosity difference in the innermost periphery of the electrode group is increased, the cycle characteristic is degraded. That is because the porosity difference especially in the innermost periphery of the electrode group increases the strain due to the expansion and contraction of the negative electrode active material. This can be recognized also by the fact that the larger the porosity difference is, the larger the expansion of the group diameter in a charge state is.

As shown in sample 1 and sample 3, the porosity difference in the outermost periphery of the electrode group hardly affects the cycle characteristic or the like. However, in sample 3 having large porosity difference in the outermost periphery of the electrode group, the initial capacity is small because the amount of the negative electrode active material is relatively small.

In the present embodiment, winding-type cylindrical non-aqueous electrolyte secondary battery is described. However, the shape of a battery of the present invention is not limited to the cylindrical shape. A flat battery, a winding-type square battery, a coin-shaped battery of laminated structure, and a laminated battery may be used.

INDUSTRIAL APPLICABILITY

The present invention is useful for achieving, using a negative electrode active material of high expansion and contraction, a non-aqueous electrolyte secondary battery of high capacity and reliability that is expected to be greatly demanded in the future.

The invention claimed is:

1. A non-aqueous electrolyte secondary battery comprising:
a negative electrode having columnar first negative electrode active materials formed on a first surface of a negative electrode current collector and having columnar second negative electrode active materials formed on a second surface of the negative electrode current collector so as to reversibly insert and extract a lithium ion, the second surface being opposite the first surface;
a positive electrode having positive electrode mixture layers on both surfaces of a positive electrode current collector, the positive electrode mixture layers containing a positive electrode active material capable of reversibly inserting and extracting a lithium ion; and
a separator between the positive electrode and the negative electrode, the separator facing the positive electrode and the negative electrode,
wherein the negative electrode, the positive electrode and the separator are wound together to form an electrode group, and
wherein a width of the columnar first negative electrode active materials along a winding direction of the electrode group is equal to a width of the columnar second negative electrode active materials along the winding direction, and a height of the columnar first negative electrode active materials is different from a height of the columnar second negative electrode active materials so that a difference between porosity between the first negative electrode active materials in the negative electrode and porosity between the second negative electrode active materials is more than 0% and at most 1.1%.

2. The non-aqueous electrolyte secondary battery of claim 1, wherein
a density of the first negative electrode active materials of the negative electrode is equal to a density of the second negative electrode active materials.

3. The non-aqueous electrolyte secondary battery of claim 1, wherein
the columnar first negative electrode active materials and the columnar second negative electrode active materials are made of a material that reversibly inserts and extracts at least a lithium ion and has a theoretical capacity density exceeding 833 mAh/cm$^3$.

4. The non-aqueous electrolyte secondary battery of claim 3, wherein silicon-containing particles are used as the material.

5. The non-aqueous electrolyte secondary battery of claim 4, wherein
the silicon-containing particles are silicon oxide particles expressed by $SiO_x$ ($0.3 \leq x \leq 1.3$).

6. A non-aqueous electrolyte secondary battery comprising:
a negative electrode having columnar first negative electrode active materials formed on a first surface of a negative electrode current collector and having columnar second negative electrode active materials formed on a second surface of the negative electrode current collector so as to reversibly insert and extract a lithium ion, the second surface being opposite the first surface;
a positive electrode having positive electrode mixture layers on both surfaces of a positive electrode current collector, the positive electrode mixture layers containing a positive electrode active material capable of reversibly inserting and extracting a lithium ion; and
a separator between the positive electrode and the negative electrode, the separator facing the positive electrode and the negative electrode,
wherein the negative electrode, the positive electrode and the separator are wound together to form an electrode group, and
wherein a height of the columnar first negative electrode active materials is equal to a height of the columnar second negative electrode active materials, and a width of the columnar first negative electrode active materials along a winding direction of the electrode group is different from a width of the columnar second negative electrode active materials along the winding direction so that a difference between porosity between the first negative electrode active materials in the negative electrode and porosity between the second negative electrode active materials is more than 0% and at most 1.1%.

7. The non-aqueous electrolyte secondary battery of claim 6, wherein
a density of the first negative electrode active materials of the negative electrode is equal to a density of the second negative electrode active materials.

8. The non-aqueous electrolyte secondary battery of claim 6, wherein
the columnar first negative electrode active materials and the columnar second negative electrode active materials are made of a material that reversibly inserts and extracts at least a lithium ion and has a theoretical capacity density exceeding 833 mAh/cm$^3$.

9. The non-aqueous electrolyte secondary battery of claim 8, wherein silicon-containing particles are used as the material.

10. The non-aqueous electrolyte secondary battery of claim 9, wherein the silicon-containing particles are silicon oxide particles expressed by $SiO_x$ ($0.3 \leq x \leq 1.3$).

11. A non-aqueous electrolyte secondary battery, comprising:
a negative electrode having columnar first negative electrode active materials formed on a first surface of a negative electrode current collector in a winding direction and having columnar second negative electrode active materials formed on a second surface of the negative electrode current collector so as to reversibly insert and extract a lithium ion, the second surface being opposite the first surface;
a positive electrode having positive electrode mixture layers on both surfaces of a positive electrode current collector, the positive electrode mixture layers containing a positive electrode active material capable of reversibly inserting and extracting a lithium ion; and
a separator between the positive electrode and the negative electrode, the separator facing the positive electrode and the negative electrode,
wherein the negative electrode the positive electrode and the separator are wound together to form an electrode group, and
wherein a difference between porosity between the first negative electrode active materials in the negative electrode and porosity between the second negative electrode active materials is more than 0% and at most 1.1% and a shape of the columnar first negative electrode active materials is equal to a shape of the columnar second negative electrode active materials, and an interval between the columnar first negative electrode active materials is shorter than an interval between the columnar second negative electrode active materials.

12. The non-aqueous electrolyte secondary battery of claim 11, wherein:
the positive electrode mixture layers include a first layer facing the columnar first negative electrode active materials and a second layer facing the columnar second negative electrode active materials, and
a ratio of a density of the positive electrode active material in the first layer with respect to a density of the columnar first negative electrode active materials is equal to a ratio of a density of the positive electrode active material in the second layer with respect to a density of the columnar second negative electrode active materials.

13. The non-aqueous electrolyte secondary battery of claim 11, wherein
the columnar first negative electrode active materials and the columnar second negative electrode active materials are made of a material that reversibly inserts and extracts at least a lithium ion and has a theoretical capacity density exceeding 833 mAh/cm$^3$.

14. The non-aqueous electrolyte secondary battery of claim 13, wherein silicon-containing particles are used as the material.

15. The non-aqueous electrolyte secondary battery of claim 14, wherein
the silicon-containing particles are silicon oxide particles expressed by $SiO_x$ ($0.3 \leqq x \leqq 1.3$).

* * * * *